Patented Apr. 25, 1939

2,155,858

UNITED STATES PATENT OFFICE 2,155,858

REFRACTORY MATERIAL

Arthur Frederick Greaves-Walker and Robert Le Grande Stone, Raleigh, N. C., assignors to Feldspathic Research Corporation, New York, N. Y.

No Drawing. Application March 18, 1937, Serial No. 131,750

3 Claims. (Cl. 106—9)

The present invention relates to refractories containing olivine as the major component, and preferably consisting largely of olivine, so that in the final material, the amount of olivine is more than (and usually several times more than) the sum of all of the other components. We are of course familiar with the fact that it has heretofore been proposed to make refractories from olivine as a major component, but the products heretofore produced have not been very satisfactory.

In referring herein to the use of olivine, we intend to cover the minerals comprising dunite, which material is readily accessible in several places in the United States, in commercial amounts.

In referring herein to bricks, it is not intended to imply that the shaped products must be rectangular in every cross-section, but the term is intended to cover all blocks or shapes where one or more of the sides may be curved (inwardly or outwardly) as well as blocks having other cross-section besides rectangles. The refractory material may be made up into blocks, or may be used in, say, a more or less pasty condition as a cement for laying up brick walls, in which case the solid material should preferably be in a rather finely powdered condition, or in other cases, such a paste may be used for patching purposes, and the patching material may, if desired, be of a concrete-like structure, namely large pieces and small pieces together with water or other aqueous liquid, such a composition being used for patching up places where the bricks have become injured or broken, or where other types of linings need repairs or patching or plugging (which may sometimes be of a temporary nature).

It will be understood by those familiar with open hearth furnaces, that in ordinary practice about 2800° F. is the highest temperature existing in the open hearth furnace, this being the temperature of the gases in the upper part of the furnace. The refractories, for use in such furnaces should have a melting or softening point of at least 2800 to 2850° F. In accordance with the present invention, we can produce bricks having a much higher melting or softening point than here indicated, so that it is possible to run the furnace with the improved bricks of the present invention used as a lining, at considerably higher temperatures, the maximum temperature even reaching 3300° F., or more in some cases. In order to be satisfactory as linings for open hearth furnaces (including the roof or arch of the furnace) it is necessary that the bricks should have a very high spalling resistance, because in the ordinary operation of an open hearth furnace, the furnace itself is opened at more or less frequent intervals, which causes rapid loss of heat and consequently rapid cooling of the refractory linings.

Depending upon the properties desired in the bricks, different kinds of bonding agents can be employed. As typical of these, the following may be mentioned:

|  | Percent |
|---|---|
| Silicate of soda (figured on anhydrous basis) | 1 to 8 |
| High alumina cement | 2 to 14 |
| Sulphite pitch | 2 to 5 |
| Hydrous aluminum silicate (preferably a refractory plastic clay) | 2 to 20 |

On account of the fact that olivine or dunite materials may contain substantial amounts of low melting constituents, such as iron and magnesium metasilicates, silica, iron oxide and the like, there should be used with the olivine and bonding agent, a conversion agent which is capable of converting these low melting constituents of the dunite rocks into high melting or refractory materials. Calcined dolomite, calcined magnesite and calcined limestone are satisfactory conversion agents, other conversion agents which may be used include bauxite (or alumina in other forms both of which will hereinafter be included in the term "aluminum oxide material"), also chrome-iron ore, or other chome ores or chromite or chromium oxide or chromium salts which by heating yield chromium oxide or mixtures containing chromium oxide. The latter group of materials will be referred to hereinafter as "chromium oxide material". The term "magnesium limestone" will hereafter be used to designate a carbonate material containing more $MgCO_3$ than $CaCO_3$. The term "dolomite" will hereafter be used to designate material having approximately equal proportions of $CaCO_3$ and $MgCO_3$. The term "magnesite" will hereafter be used to designate material being essentially $MgCO_3$ with little or no $CaCO_3$. It is to be understood that we use material having any ratio of $CaCO_3$ to $MgCO_3$ with equally good results.

The term "calcine" is often used in referring to a material containing a slight amount of the original $CO_2$ after heat treatment and in other instances it refers to material that contains no $CO_2$. The latter is properly referred to as "deadburned." However, in common usage, the term, "calcine" refers to both. Hereafter, the term "calcine" will refer to both types of material.

Some geophysicists commonly use the term "olivine" in referring to a large group of minerals, such as the Ca-Fe olivines and the Mg-Fe olivines. In this specification, we use the term in the mineralogical sense to cover the Mg-Fe olivines only. The rock "dunite" contains only the Mg-Fe olivine which is properly termed "chrysolite". It is common mineralogical usage to call the Mg-Fe olivines simply "olivine".

In all modifications of the present invention, the refractoriness of the bricks, as well as the resistance of the bricks against spalling and the mechanical strength of the bricks at high temperatures can be greatly increased, and further reduction or elimination of the shrinkage of the bricks when heating, can be secured by precalcining the pulverulent or granular olivine while intimately mixed in some or all cases with the conversion agent. This step, if employed, in all cases greatly improves the qualities of the finished bricks but it will be understood that in cases where the said improvements are not needed, this precalcining can be omitted.

In this step all of the olivine, with all of the conversion agent can be so calcined, or only a part of the olivine mixed with all of the conversion agent can be so calcined. Thus in many cases it is sufficient to so calcine a mixture of 1 to 3 parts of olivine with 3 to 1 parts of the magnesite or magnesian limestone, or dolomite (raw or calcined), then add enough of the raw olivine to give a proportion of $MgO+CaO$ (from the conversion agent), up to about 3 to 8%. Then add sodium silicate as a bonding agent (either in the anhydrous condition, plus water, or in the dissolved state). When sodium silicate is to be used as the bonding agent, it is far preferable to use a sodium silicate having a $Na_2O:SiO_2$ ratio about 1:3.22. This ratio is particularly suitable for the cements that must be stored in air tight drums. When dolomite, magnesite or magnesian limestone in either the uncalcined form or calcined form, is to be employed as the conversion agent in conjunction with sodium silicate as the bonding agent, it is necessary to precalcine all of the said conversion agent with all or part of the olivine, so that free lime or free magnesium oxide will not be present in the material to be mixed with the sodium silicate. The reason for this is that free lime or free magnesia, in a mixture to be mixed with sodium silicate would react therewith forming a precipitate of calcium silicate or magnesium silicate, which has no substantial amount of bonding power.

Prior to the precalcination of the dolomite with all or a part of the olivine (irrespective of the binder to be used) the dolomite itself can be calcined by itself, this making a somewhat denser product. Such a step is generally not necessary, when the mixture of the same with the olivine, is to be calcined.

When bauxite or other form of hydrated alumina is to be used as the conversion agent (irrespective of what bonding agent is to be used) the bauxite should be calcined, either alone or in admixture with some or all of the olivine, to eliminate $H_2O$.

When chromite or chromium oxide material is to be used as the conversion agent, it is not necessary to previously calcine this.

In the latter two cases, all or a part of the olivine may be calcined with all or a part of the conversion agent before mixing with the bonding agent, or not, as desired.

A further advantage of the present invention is that in many of the modifications of the process, it is not necessary to burn the bricks. In such cases the bricks have as good (and in many cases better) properties in an unburned or "unfired" condition as when fired. Since according to the usual heretofore followed practice of making fired refractory bricks, 40 to 70% of the total cost of the finished bricks is the cost of burning the same, it will be seen that a considerable saving is effected when the firing can be omitted.

Manufacturers have found that olivine brick (made without the calcining operation which is peculiar to this invention) must be burned to pyrometric cone 31 (3060° F.) before the pyrochemical reactions are complete. This makes firing olivine brick exceedingly expensive. Our calcining operation permits these pyrochemical reactions to take place at much lower temperatures. It is, also, much cheaper to produce these pyrochemical reactions in a rotary kiln than by first forming the brick and then firing the product to extremely high temperatures. A much superior product is made when using our calcining process as compared with that made by the conventional method.

We desire particularly to call attention to the calcining process. Other inventors have suggested that dead burned, pure magnesite be mixed with the olivine and the bonding agent, which was magnesium oxychloride, the mixture then being pressed into bricks under very high pressure. These bricks were fired to a high temperature to complete the pyrochemical reactions. Any defective bricks so-formed were then recrushed to the desired grain size. The crushed material was then incorporated with more bonding agent and re-formed.

We have found it possible to perform the calcining in a rotary kiln without first pressing the mixture into bricks. This method is new and novel and permits several advantages of decided importance. First, the very expensive steps of pressing into bricks and crushing the fired bricks are eliminated. The elimination of these steps is of importance to the manufacturer as both increase the cost of the product. Second, the product of the rotary kiln method of calcining has better forming properties than the product made by crushing pressed bricks. The olivine may be crushed and screened to the desired size before calcining; hence the product of the rotary kiln can be used directly in making bricks without any secondary classification by screens. A denser, more stable brick is made from the rotary kiln product, which property is very desirable.

We also desire to point out that the olivine may be taken directly from the primary crusher (where the grains are reduced to ¼ inch to ½ inch size) and calcined with the conversion agent. After calcining, the calcined material may be further crushed and screened as desired.

These statements are made to show the flexibility of our process, and the great advantages it has over any prior art. It is both novel and is of great economic importance.

In the preferred form of the process, the olivine is crushed to give a mixture of granular material and powder, the degree of fineness depending on the character of the product required. The conversion agents are preferably crushed to a fine powder free from lumps or granules. Thus in a case where the olivine all passes a 20 mesh screen, the dolomite (or calcined dolomite) to be mixed therewith should best all pass a 40 to 60 mesh screen.

In precalcining the olivine, it is best to first mix it with the conversion agent selected. In this way, during the precalcination of the olivine, low melting components thereof melt and exude from the granules and quickly come in contact with the conversion agent also undergoing precalcination, whereby these low melting constituents of the olivine are quickly converted into refractory products. The calcining is best accomplished under reducing conditions. The reducing atmosphere in the calcining furnace causes the pyrochemical reactions to take place at a lower temperature, thereby lowering the cost of calcining.

We have selected the term "conversion agents" to designate materials that act to convert the low melting constituents of the olivine, into refractory products.

It will be noted that, as illustrated below, we use a single conversion agent and a single bonding agent, in any particular formula. It is not necessary nor advisable to use more than one conversion agent or more than one bonding agent in any one batch. An attempt, for example, to use two of the above conversion agents will give unsatisfactory results, due to interaction of the two conversion agents, or two bonding agents might also give unsatisfactory bricks. There is only one case when two of the conversion agents can be used simultaneously. The dolomite, magnesium limestone, or magnesite may be used in conjunction with the chrome ore with satisfactory results. Such a mixture is not highly desirable because other of these mixes produce superior results.

Among the objects of our invention is to produce unfired olivine refractories of excellent physical and mechanical and refractory properties, which will be capable of withstanding thermal shocks and capable of bearing greater load at high temperature than any olivine refractory heretofore made, and which shall show a minimum of shrinkage during the step of heating to working temperature.

The following examples are given (parts being by weight, and temperatures given in degrees Fahrenheit) purely for the purpose of illustration, and we do not restrict ourselves to the details thereof, except as specified in the appended claims.

Example 1

This example illustrates the use of sodium silicate binder (bonding agent) in conjunction with dolomite.

A mixture is made of olivine and dead burned dolomite, in the ratio of 1:3 or 3:1 or any intermediate proportion. This mixture is calcined, say in a rotary kiln, at about 2600° F. Enough of the calcined material is then added to raw olivine, to give about 1 to 8% of the dead burned dolomite in the mixture. Then sodium silicate is added to the dry-mix, and the mixture is made uniform by mixing, for example in a common cement mixer. In a particular instance, 6% of the dead burned dolomite was added, based on the entire weight of the olivine to be added, and about 3.5% of the sodium silicate (figured on the anhydrous basis) was used. The moistened mixture to be molded, was made by spraying cold water upon the mixture of olivine, calcined olivine-dolomite mixture and sodium silicate. The amount of moisture in the mixture was about 3.0%. This mixture was then dry-pressed into the form of bricks, at 6000 pounds pressure per square inch, and the bricks dried by placing the same in a heated oven at 350° F. for 12 hours.

The bricks had a cold strength of over 6000 pounds per square inch, and upon heating will not fail under 50 pounds per square inch, at 2460° F. These bricks were absolutely unaffected in the spalling test when standard magnesite brick and standard olivine brick were completely destroyed. It will be seen that in this particular example the mixture to be bonded by the sodium silicate was 88% of raw olivine and 12% of a calcined mixture of equal parts of raw olivine and dead burned dolomite.

A product nearly as good would have been produced, if the raw dolomite had been mixed with the olivine and calcined.

Magnesite may be substituted for dolomite in this example, which however only very slightly improves the product. A magnesium limestone containing about 5 to 6% of CaO can be substituted for the dolomite, and the product will be nearly as good.

Example 2

7 to 9 pounds of raw dolomite (say 9 pounds in a particular case) were mixed with 96 pounds of raw olivine, and the entire mixture calcined at above 2850° F. To the above mixture, 3.5% of sodium silicate of the kind above referred to were added, in the form of a 42.2° Bé. solution. The mass was dry pressed, without further addition of water, at 6000 pounds pressure. The bricks had a cold strength of 6000 pounds or better. The bricks after being dried as in Example 1, were found not to fail under 50 pounds pressure per square inch, at 2900° F., and were found to have a spalling resistance equal to that of the bricks in Example 1. These bricks were found to withstand reducing conditions at 2850° F. (bricks made in accordance with Example 1 would not stand this latter test). In other modifications of this example, various temperatures between 2600 to 3200° F. may be used in the calcining step, and the amount of silicate of soda may vary between 2 and 4%. It is advisable to calcine the material at about the highest temperature which is to be encountered in the furnace where the bricks are to go into service.

It will be seen that when sodium silicate is to be used as a binder, and magnesium limestone, dolomite or magnesite is to be used as the conversion agent, as in the above two examples, the conversion agent (whether or not the same is precalcined) should be calcined with the olivine or with a portion of the olivine, in order that the calcines should be free from CaO and MgO in the uncombined condition.

Example 3

In this example chrome ore or chromium oxide or chromite is used as the conversion agent. 1 to 8% of the chrome ore are added to olivine, without any calcination. Sodium silicate, in amount of 1 to 6% (anhydrous basis) constitutes the binding agent. The bricks are suitable for use unfired.

A preferred mix is 97% of raw olivine and 3% of chrome ore (or an equivalent amount of chromium oxide or other material containing chromium oxide). 3 up to 3.5% of sodium silicate (anhydrous basis) constitutes a very suitable bonding agent for this mixture.

Example 4

The chrome ore or chromium oxide to be used in Example 3 is precalcined with olivine, in the proportion of 1:3 or 3:1 or any intermediate proportion. A sufficient further quantity of the raw olivine is added to give 3% of the chrome ore, in the mixture. The other details of the process are followed as in Example 3. The bricks are slightly better at higher temperatures, than those produced in Example 3, but the cost of making the same is substantially more on account of the calcining operation.

It will be understood that it is also possible to calcine the chrome ore with all of the olivine, thereby producing bricks which are slightly better than those produced in the last mentioned example. Where chrome ore is referred to in these two examples, an ore containing 48.0% of chromium oxide, largely in the form of chromite, was found to be satisfactory.

Example 5

In this example bauxite constitutes the conversion agent and sodium silicate is the bonding agent. The bauxite may or may not be calcined prior to use. (The calcined bauxite produces slightly superior results.) All of the bauxite and all of the olivine are thoroughly mixed and calcined as given in other examples. A typical composition of this mixture to be calcined is:

| | Per cent |
|---|---|
| Olivine | 97 |
| Anhydrous bauxite | 3 |

The other details of the process are followed as in Example 1.

3% to 3.5% sodium silicate is preferred as the bonding agent. A further modification of this example is to use 1 to 8% of the bauxite or other aluminous material, and 1 to 6% sodium silicate (figured on the anhydrous basis).

Example 6

In this example bauxite constitutes the conversion agent, and high alumina cement is the bonding agent. In modifications of this example, 1 to 8% bauxite (figured on the anhydrous basis), and 5 to 20% high alumina cement may be used.

We give two particular modifications of this example:

(a) 3% to 3.5% anhydrous bauxite is mixed with 97 to 96.5% raw olivine, 8 to 10% high alumina cement figured on the weight of the above mixture is added. 4.0 to 5.0% water is thoroughly incorporated. The other details of the process are as in Example 1.

(b) 3% to 3.5% bauxite (either pre-calcined or not) is mixed with 97 to 96.5% raw olivine and the mixture calcined as in Example 2. The calcine is mixed with 8 to 10% high alumina cement. 4 to 5% of water is then thoroughly mixed in, and the moistened mass pressed at 4,000 to 6,000 pounds per square inch pressure.

More than 8% bauxite cannot be used satisfactorily in the calcine. A calcine having ⅓ to ⅔ bauxite is not satisfactory.

A particular modification is the manner in which mixes containing the high alumina cement are dried. After pressing, the brick are kept in a room at low temperatures (between 40 and 70° F.) and having high humidity conditions (80–90% relative humidity) for 48 hours. This allows the cement to acquire full bonding power. After this treatment, the brick are dried as before. Brick dried too rapidly after pressing will have a very weak shell about ⅛ inch from the surface.

Example 7

Magnesian limestone, dolomite, or magnesite are the conversion agents and high alumina cement is the bonding agent. The dolomite (or either of the other two conversion agents) may be used in amounts from about 1% up to 12%, preferably about 6 or 8%. The high alumina cement may be used in amounts from 5% to 20%, preferably about 8 to 10%. Several modifications of this example are given.

(a) Precalcined dolomite or the like is the conversion agent. About 6 or 8% of the precalcined dolomite is mixed with 94 to 92% of raw olivine, and the high alumina cement is added in about 8 to 10% of the weight of the above mixture. 4.0 to 5.0% of water is then added and thoroughly mixed. The other details of the process are as in Example 6.

(b) A mixture is made of the olivine and the dolomite, in the ratio of 1:3 or 3:1, or any intermediate proportion. The dolomite may or may not, as desired, be precalcined. This mixture is calcined, say in a rotary kiln, at about 2600° F. Enough of the calcined material is then added to raw olivine to give about 6 to 8% of CaO+MgO (from the conversion agent) in the mixture. High alumina cement is added to about 8 or 10%, and 4 or 5% of water thoroughly mixed in. The other details of the process are given in Example 6.

(c) If it is desired to produce bricks which are highly refractory, and which will withstand reducing conditions at elevated temperatures, all of the olivine and all of the conversion agent to be used in the product can be mixed and calcined. About 8 or 10% of high alumina cement is used as the bonding agent. Other details of the process are given in Example 6.

Example 8

Chromium ore or chromium oxide, is mixed with olivine in any ratio between 1:3 and 3:1, say in equal amounts, and the mixture calcined. Then enough of the raw olivine is added so that the mixture will contain about 1 to 14% of chromium oxide or an equivalent amount of the chrome ore, and about 5 to 20% of high alumina cement are added. A preferred mix would be 92 parts of raw olivine, 8 parts of a calcined mixture of equal parts of olivine and chrome ore (containing about 3 parts of chromium oxide) and about 10 parts of the high alumina cement. This mixture, molded into blocks as described above, can be used in the unfired condition, and will be found to be dense and highly refractory.

In this modification also, the olivine can be used wholly in the uncalcined condition, or all of the olivine can be mixed with all of the chrome ore or chrome oxide to be used in the product, and calcined. The greater the amount of the calcined material (olivine plus chrome ore or chrome oxide) the better will be the product, but obviously more expensive. Products in which the olivine or a large portion of it has been calcined with the conversion agent, will take a great amount of punishment in the furnaces in which the same is used.

Example 9

Hydrous aluminum silicate is used in the bricks, with olivine, as the bonding agent. Any one of the conversion agents referred to above can be employed and the olivine plus the conversion agent may be uncalcined, partly calcined or wholly calcined, the calcination of course improving the properties of the bricks. The hydrous aluminum silicate preferably employed is a clay with a high fusion point (pyrometric cone 30 or better), having medium to high plasticity.

In carrying out this modification of the process, the conversion agent is added to the olivine, the mixture calcined or not, and the powdered clay of the type given is mixed with the same, the mass moistened and molded. In a modification the clay may be first made up into a slip, which is mixed with the mixture of olivine and conversion agent. Preferably about 8% of the clay is employed, but the proportion may be up to 18 or 20% in some cases. After molding the bricks, they are fired before use. The products are cheaper than the fired bricks containing high alumina cement, but are rather more costly than the unfired high alumina cement bricks (of otherwise similar composition).

A preferred mix consists of 10% clay added to a calcine which contains all of the olivine and all of the conversion agent (any one of those heretofore mentioned). This mixture is moistened with 4 or 5% of water, pressed, and dried as in Example 1. This pressed product which contains only calcined material can be fired to pyrometric cone 14. This is a much lower temperature than cone 26 or above that would be necessary if calcined material were not used. The firing operation produces the bond.

A particular property of the bricks containing all calcine is that they may be stacked several brick high during firing. Other brick must be "boxed" and this is very expensive.

Example 10

Sulphite pitch is used as the bonding agent. Any of the above conversion agents may be used. If dolomite or the like is used, the dolomite must be calcined with all or part of the olivine because free CaO or MgO are detrimental to the sulphite pitch. The other conversion agents may be used calcined or not, as desired. About 2% (on the dry basis) of the sulphite pitch may be used as the bonding agent. The process is particularly applicable in the case of burned bricks. The products of this process generally are somewhat weaker (when fired at the same temperature) compared with those made by the use of other binders mentioned, and fired. The bricks produced are of a more porous character, and hence are more advantageous for uses where the insulating properties are used, for example for building or lining a "soaking pit". While 2% of the sulphite pitch is referred to in this example, a larger amount, say up to about 5%, may be used in some instances.

With regard to all of the products mentioned above, and particularly with regard to the unfired brick, it is called to attention that very excellent spalling properties are produced in the said brick. The unfired brick made under the present invention, have far better spalling properties (show a higher spalling test) than any prior products composed largely of olivine. The unfired bricks are of course also much cheaper to make, inasmuch as 40 to 70 per cent of the total cost of finished fired bricks, represents the cost of firing.

We are of course aware that olivine has heretofore been proposed as a constituent of refractory bricks and the like. So far as we are able to ascertain, any products made heretofore, consisting largely of olivine, or in which olivine constituted the major constituent, have been of a rather poor quality, and unsuitable for use in high temperature equipment.

We desire to call attention to the fact that very superior products are obtained when all of the olivine is calcined with all of the conversion agent prior to making the brick. In using dolomite, magnesite or magnesium limestone or bauxite or other form of high grade alumina or chrome ore or chrome oxide as the conversion agent, these should be previously calcined, to reduce shrinkage in the final bricks. When any conversion agent containing calcium or magnesium carbonate or oxide or a mixture of these is to be used in conjunction with sodium silicate as the bonding agent, the said conversion agent should be first calcined in admixture with all or a part of the olivine, so that there will be no free lime or free magnesia in the mixture with which the sodium silicate is to be used. For the calcination of the olivine (either the whole of the olivine or a portion thereof) with the conversion agent, it is advisable to conduct this calcination at about the highest temperature that the final brick will be called upon to stand in service. In that way any reactions which are to take place at the said temperature will already have taken place during the calcination.

Calcination of all of the olivine with all of the conversion agent is particularly advantageous when high alumina cement is to be used as the binder, with any of the conversion agents mentioned above, because all of the reactions will have been completed in the calcination treatment, and shrinkage eliminated, and the final bricks will readily stand a temperature of 2700° F., or even more, under reducing conditions, without loss of strength, and without spalling.

In the above examples, or several of them, we have stated the amount of water to be used in moistening the mixture to be molded. These quantities are advisable for the purpose of molding a relatively dry mixture. This is generally more advisable, but we call attention to the fact that it is entirely permissable to use much larger quantities of water, so as to form a more liquid mass for "slop molding". Bricks molded in the latter manner generally have good compressive strength, but it will be understood that the process is thereby rendered more expensive because "slop molding" is a hand process.

We call attention to the fact that in using silicate of soda as a binder, we have specified 1 to 8% (figured on the anhydrous bases) as the preferred amount to use. It is sometimes permissible to go slightly above 5%, but generally speaking it is inadvisable because the salts of alkali metals have a much lower melting point than the compounds of alkaline earth metals and the like. In other words the addition of large amounts of sodium silicate, tend to reduce the refractory qualities of the final brick. If it is desired to use sodium silicate as the bonding agent, in a slop molding process, it is advisable not to use more actual sodium silicate than there indicated, and to dilute the sodium silicate solution with a considerable amount of water before applying the same.

Sodium silicate has been mentioned in several of the above examples. We are aware of the fact that disclosures have heretofore been made where waterglasses (potassium or sodium silicates) have been incorporated as a bonding agent for refractory materials (including chrome refractories); however, it is new to use silicate of soda as a bonding agent with a precalcined mixture of olivine and a conversion agent. As far as we know, no disclosures have been made suggesting the use of sodium silicate in this new manner.

Furthermore, disclosures have been made to using simply "waterglass." This term covers an extremely wide range of composition of sodium silicates with an accompanying large range of physical and chemical properties. We have found upon extensive investigation that just any waterglass will not be satisfactory as a binder. We desire to make it clear that wherever silicate of soda is mentioned herein, we use a silicate of soda with very definite properties and having a very definite composition. It must have excellent adhesive properties when dry and must cover the grains of olivine and/or calcines thoroughly. It must be comparatively refractory and must not cause scumming of the bricks, in ordinary weather conditions after pressing. It must be comparatively insoluble in water after drying. These properties are possessed by silicates of soda having a soda to silica ratio between 1:2.50 and 1:3.25, figured as mols of $Na_2O$ to mols of $SiO_2$. These constitute the most satisfactory silicates for use as the binder in the present invention.

We call attention to the fact that, as stated above, the amount of sodium silicate may be small, i. e., only about 1% in some cases. That such a small amount of this material would serve as a binder, and produce bricks that are strong at furnace temperatures seems unexpected. Concerning the use of high alumina cement (or, as is sometimes called, calcium aluminate cement), we believe that it is new to use said cement with our precalcined olivine-conversion agent mixtures.

Testing of bricks made by our invention when placed in the roof and bulk-heads of a basic open hearth furnace has proven that the bricks made as disclosed herein gave very superior results.

We have pointed out above, the advantages of unfired brick, from the standpoint of cost of manufacture. We are able to produce unfired brick of unprecedented high refractoriness and spalling qualities, on account of the precalcination of the olivine (or at least a substantial part of the olivine) and this while mixed with the conversion agent, such for example as dolomite or equivalent.

We have found that bricks made wholly from uncalcined materials may crack lengthwise when subjected to thermal shock, whereas bricks made from the calcined materials will not crack, thereby producing a product of far greater value.

We have above referred to the use of mixtures as described above, as a cement, both for laying up walls or baffles or floors or hearths in which high refractory qualities are desired, and which will be of high spalling resistance. They can also be applied by spraying, when in the form of a creamy mix, to form a sprayed-on lining or coating, being sprayed on to bricks, metals or other structures.

There is a particular advantage in using a cement which has about the same composition as the bricks to be joined together by the cement, since the expansion or contraction properties will be about the same, rendering the finished constructions more stable.

A modification of this invention is, therefore, to grind any of the mixtures above mentioned to a finely pulverulent state and using same as a refractory cement, for forming bricks of that or similar compositions.

The compositions above described can also be used for "patching cement", in furnaces. This may be applied as a "concrete", a part of the material being fine ground, and other parts coarse. Thus a part (say 30 to 60%) is ground to pass a 10 mesh or 8 mesh screen while the rest is left as larger lumps, retained by such a screen and it may contain some lumps of a size up to half inch, more or less. This grinding can be done dry, and the material then well mixed with water, if desired.

The term "brick" as herein employed, is not intended to be restricted to rectangular shapes of a given size, but is intended to cover shaped structures generally, irrespective of particular size and/or shape, suitable for use as units in furnace linings, hearths, pots, crucibles, or in the construction of such structures.

This application is a continuation-in-part of our copending application Serial Number 50,986, filed November 21, 1935.

We claim:

1. A mix suitable for manufacture of basic refractory bricks, containing as a substantial constituent, a calcined pulverulent mixture of dolomite and olivine.

2. An unburned refractory shaped product including pulverized olivine, pulverized dolomite initially having a calcium carbonate content of not more than 50%, previously calcined in admixture with pulverized olivine, said shaped product containing silicate of soda as a bonding agent, the olivine being in amount several times more than the combined amounts of all the other constituents therein, said components being compressed together to shape, in a moistened state and dried.

3. An unburned shaped refractory product, including comminuted olivine, up to 12% of comminuted dolomite initially having calcium carbonate content of not more than 40%, previously calcined in admixture with comminuted olivine, and silicate of soda in an amount up to approximately 6% (anhydrous basis), said components being compressed together to shape in a moistened state, and dried, and adapted for use as a furnace lining without previously being fired, the total amount of olivine being in amount at least several times the sum of all other components of said product.

ARTHUR FREDERICK GREAVES-WALKER.
ROBERT LE GRANDE STONE.